(12) United States Patent
Kim et al.

(10) Patent No.: US 10,197,833 B2
(45) Date of Patent: Feb. 5, 2019

(54) SUPPORTING COVER FOR CURVED DISPLAY AND CURVED DISPLAY DEVICE INCLUDING THE SAME

(71) Applicant: LG DISPLAY CO., LTD., Seoul (KR)

(72) Inventors: HyunChul Kim, Gumi-si (KR); Hyun Choi, Pocheon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/337,714

(22) Filed: Oct. 28, 2016

(65) Prior Publication Data

US 2017/0123260 A1  May 4, 2017

(30) Foreign Application Priority Data

Oct. 28, 2015 (KR) .................. 10-2015-0150365

(51) Int. Cl.
  *G02F 1/1333* (2006.01)
  *G02F 1/133* (2006.01)
  *G02F 1/1335* (2006.01)
  *G02F 1/1339* (2006.01)
  *G02F 1/1345* (2006.01)

(52) U.S. Cl.
  CPC ...... *G02F 1/133308* (2013.01); *G02F 1/1339* (2013.01); *G02F 1/1345* (2013.01); *G02F 1/13306* (2013.01); *G02F 1/133528* (2013.01); *G02F 2001/133314* (2013.01); *G02F 2001/133328* (2013.01); *G02F 2201/46* (2013.01)

(58) Field of Classification Search
  CPC .... G06F 1/1601; H04N 5/64; G02F 1/133308
  USPC ..................... 361/679.01; 349/58
  See application file for complete search history.

(56) References Cited

U.S. PATENT DOCUMENTS

| | | | | |
|---|---|---|---|---|
| 7,760,491 | B2* | 7/2010 | Choi .............. | H04N 5/64 349/58 |
| 8,665,391 | B2* | 3/2014 | Li ............... | G02F 1/133308 349/58 |
| 2013/0201413 | A1* | 8/2013 | Nakase .......... | H05K 5/02 348/836 |
| 2014/0254192 | A1* | 9/2014 | Do ............... | G02B 6/0051 362/606 |
| 2016/0363805 | A1* | 12/2016 | Lee ............. | G02F 1/133308 |

* cited by examiner

*Primary Examiner* — Mukund G Patel
(74) *Attorney, Agent, or Firm* — Birch, Stewart, Kolasch & Birch, LLP

(57) ABSTRACT

Discussed are a supporting cover for curved display and a curved display device including the same, which include a fastening part for preventing a screw fastening defect. The supporting cover may include a fastening part including a screw thread which is provided in an edge of a floor having a curved shape and is inclined at an angle of N degrees from a normal line direction with respect to a curved surface of the floor, where N is a real number greater than zero, thereby preventing a screw fastening defect from occurring in assembling the fastening part and a housing.

18 Claims, 11 Drawing Sheets

SUPPORTING COVER FOR CURVED DISPLAY AND CURVED DISPLAY DEVICE INCLUDING THE SAME

CROSS-REFERENCE TO RELATED APPLICATIONS

This application claims the priority benefit of the Korean Patent Application No. 10-2015-0150365 filed on Oct. 28, 2015, which is hereby incorporated by reference as if fully set forth herein.

BACKGROUND

Field of the Invention

The present invention relates to a curved display device.

Discussion of the Related Art

With the advancement of information-oriented society, various requirements for display devices for displaying an image are increasing. Recently, since the screen of a display device has a flat form and has an enlarged size, a deviation of a viewing distance to the screen center area and a viewing distance to each of the both side areas of the screen increases. In order to reduce the deviation of the viewing distances and maximize a degree of viewing immersion of a user (or a viewer), a display device where a flat screen is curved at a certain curvature has been proposed.

A curved display device may include a supporting cover having a curved shape, a display module accommodated into the supporting cover, and a housing that surrounds a rear surface and a side surface of the supporting cover. The housing is coupled to the supporting cover by a plurality of screws. Each of the plurality of screws is fastened to the housing through a fastening part which is provided in the supporting cover, thereby fixing the housing to the supporting cover.

FIG. 1 is a diagram illustrating a supporting cover in a related art curved display device, and FIG. 2 is an enlarged view of an A portion illustrated in FIG. 1.

Referring to FIGS. 1 and 2, in the related art curved display device, a supporting cover 10 includes a floor 12 which is concavely bent to have a certain curvature R, a side wall 14 which is bent from an edge end of the floor 12, and a plurality of fastening parts 16 which are provided in an edge of the floor 12.

Each of the plurality of fastening parts 16 includes a protrusion portion 16a, which protrudes in a down direction Z to have a certain height from the floor 12, and a screw thread 16b which is provided in the protrusion portion 16a.

The protrusion portion 16a is inclined at a certain angle "θ" from a vertical line VL vertical to the floor 12 according to the curvature R of the floor 12 as the protrusion portion 16a protrudes from the floor 12, and thus, the screw thread 16b is also inclined at a certain angle "θ" from the vertical line VL.

Each of the plurality of fastening parts 16 is fastened to the screw 20 passing through the housing. In this case, the screw 20 is fastened to the fastening part 16 along a normal line direction ND of the bent floor 12, thereby fixing the housing to the supporting cover 10.

In the related art curved display device, the screw 20 has a fastening structure based on the normal line direction ND, and thus, if the screw 20 is fastened in a direction deviating from the normal line direction ND, a screw fastening defect occurs in assembling the supporting cover 10 and the housing. That is, since the angle "θ" between the normal line direction ND of the screw 20 and the vertical line VL is small, the screw 20 can be fastened to the fastening part 16 along a vertical direction parallel to the vertical line VL, causing a screw fastening defect where the screw 20 is slopingly fastened to the fastening part 16.

SUMMARY

Accordingly, the present invention is directed to provide a supporting cover for curved display and a curved display device including the same that substantially obviate one or more problems due to limitations and disadvantages of the related art.

An aspect of the present invention is directed to provide a supporting cover for curved display and a curved display device including the same, which include a fastening part for preventing a screw fastening defect.

Another aspect of the present invention is directed to provide a supporting cover for curved display and a curved display device including the same, which have a thin thickness and prevent a screw fastening defect.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a supporting cover for curved display including a fastening part including a screw thread which is provided in an edge of a floor having a curved shape and is inclined at an angle of N degrees from a normal line direction with respect to a curved surface of the floor, where N is a real number greater than zero.

In another aspect of the present invention, there is provided a curved display device including a bottom cover including a screw thread which is provided in an edge of a floor having a curved shape and is inclined at an angle of N degrees from a normal line direction with respect to a curved surface of the floor where N is a real number greater than zero, a display module accommodated into an accommodating space of the bottom cover, a housing accommodating the bottom cover and surrounding each of side surfaces other than a front surface of the display module, and a screw fastened to a screw thread of a fastening part, provided in the bottom cover, through the housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
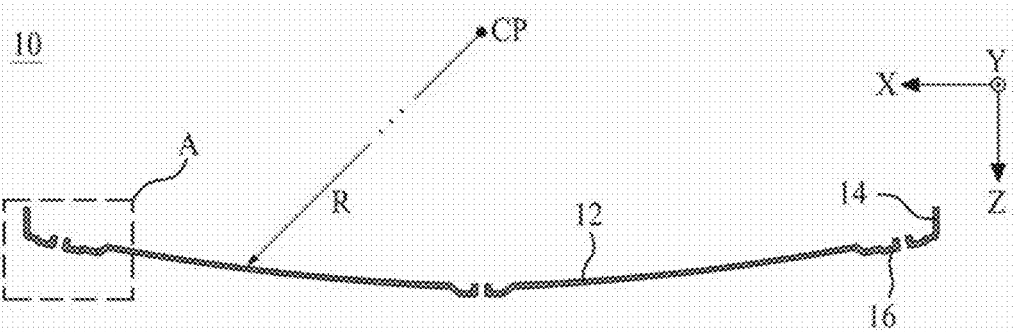
FIG. 1 is a diagram illustrating a supporting cover in a related art curved display device.
Figure 2:
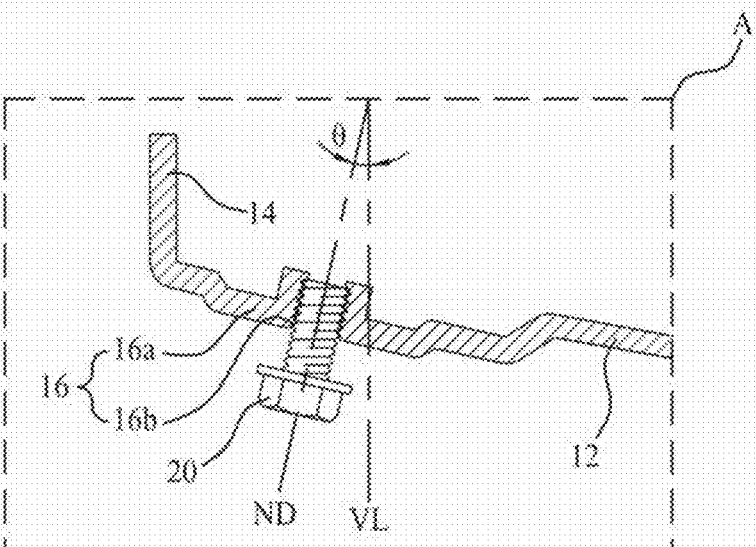
FIG. 2 is an enlarged view of an A portion illustrated in FIG. 1.

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of a supporting cover for curved display and a curved display device including the same according to the present invention will be described in detail with reference to the accompanying drawings. In adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 3:
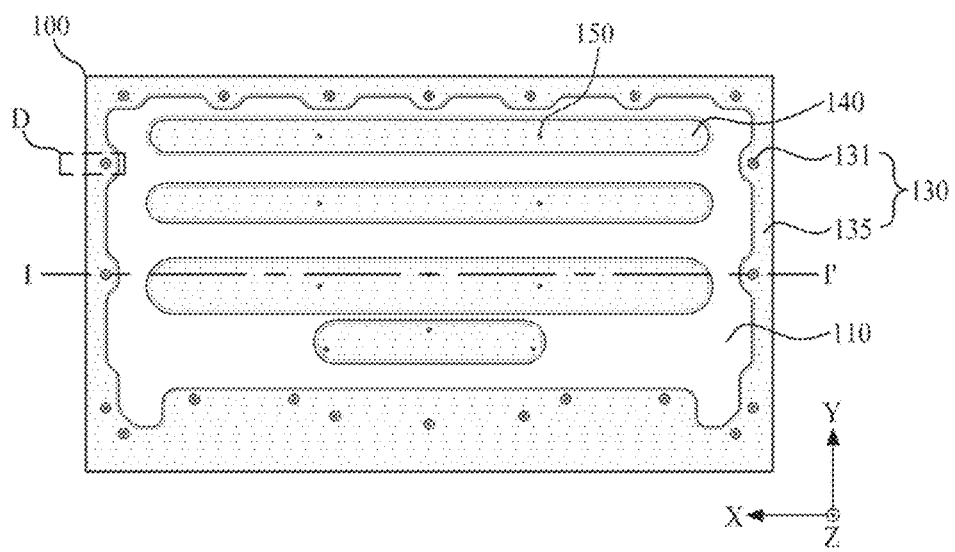
FIG. 3 is a rear view illustrating a supporting cover for curved display according to a first embodiment of the present invention.
Figure 4:
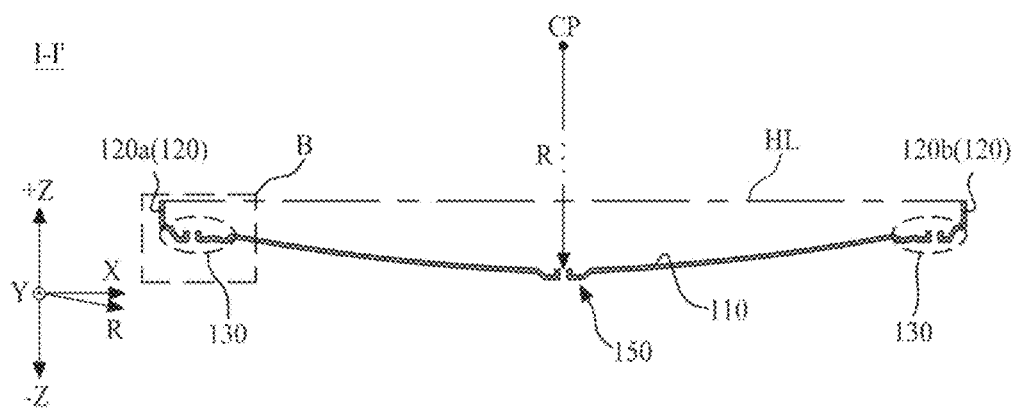
FIG. 4 is a cross-sectional view taken along line I-I' of FIG. 3.
Figure 5:
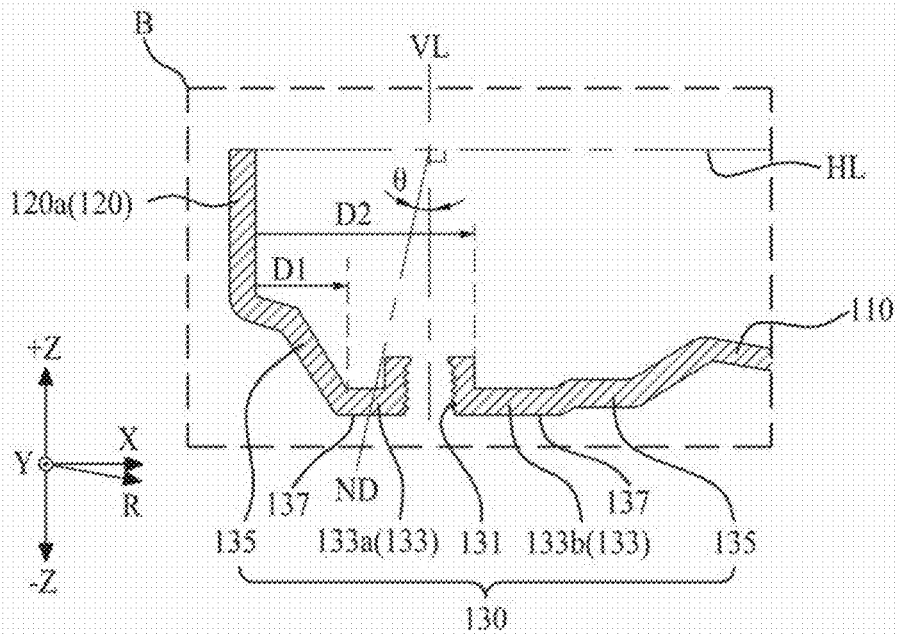
FIG. 5 is an enlarged view of a B portion illustrated in FIG. 4.

FIG. 3 is a rear view illustrating a supporting cover 100 for curved display according to a first embodiment of the present invention. FIG. 4 is a cross-sectional view taken along line I-I' of FIG. 3. FIG. 5 is an enlarged view of a B portion illustrated in FIG. 4. All the components of the supporting cover according to all embodiments of the present invention are operatively coupled and configured.

Referring to FIGS. 3 to 5, the supporting cover 100 for curved display according to the first embodiment of the present invention may include a floor 110, a side wall part 120, and a plurality of fastening parts 130.

The floor 110 may have a tetragonal plate shape. The floor 110 may have a concavely curved shape so as to have a certain curvature R with respect to a center CP. Here, the center CP of the certain curvature R may be disposed in front of the floor 110, for example, may be disposed at a position at which a viewer is located.

The floor 110 may have a portrait shape which is bent in a lengthwise direction Y and where a widthwise-direction (X) length is longer than a lengthwise-direction (Y) length or may have a landscape shape which is bent in the widthwise direction X and where the widthwise-direction (X) length is shorter than the lengthwise-direction (Y) length, with respect to the position of the viewer. In the following description, the floor 100 is assumed as being bent in the landscape shape.

The side wall part 120 may include a plurality of side walls coupled to an edge end of the floor 110. That is, the side wall part 120 may include a pair of first side walls 120a and 120b, which are coupled to widthwise both edge ends of the floor 110 to face each other, and a pair of second side walls which are coupled to lengthwise both edge ends of the floor 110 to face each other. Here, the pair of first side walls 120a and 120b may be coupled to a left edge end and a right edge end of the floor 110, and the pair of second side walls may be coupled to an upper edge end and a lower edge end of the floor 110.

The pair of first side walls 120a and 120b and the pair of second side walls may each be bent in a direction from the edge end of the floor 110 to the front of the floor 110. For example, the pair of first side walls 120a and 120b may be parallel to a vertical direction Z vertical to a virtual horizontal line HL. Here, the virtual horizontal line HL may be defined as a planar line on the floor 110 which join the pair of first side walls 120a and 120b.

Each of the plurality of fastening parts 130 may be provided in an edge of the floor 100, fastened to a screw passing through a housing of the curved display device, and supported by the housing.

Each of the plurality of fastening parts 130 according to an embodiment may include a screw thread 31 which is provided in an edge of the floor 100 adjacent to each of the pair of first side walls 120*a* and 120*b*.

The screw thread 131 may be inclined at an angle "θ" of N (where N is a real number more than zero) degrees from a normal line direction ND with respect to a curved surface of the floor 110, thereby preventing a screw fastening defect from occurring in assembling the supporting cover 100 and the housing. That is, a screw may be fastened to the screw thread 131, and in this case, in order for a screw 105 and the screw thread 131 not to have a fastening structure based on the normal line direction ND, the screw thread 131 may be inclined in the vertical direction Z by the angle "θ" of N degrees with respect to the normal line direction ND.

The screw thread 131 according to an embodiment may be provided in parallel with the vertical direction Z vertical to the virtual horizontal line HL which joins the pair of first side walls 120*a* and 120*b* facing each other. That is, the screw thread 131 may include a screw hole having a female screw thread type, and a virtual vertical line VL vertically extending from a center of the screw thread 131 may be vertical to the virtual horizontal line HL. Accordingly, the screw thread 131 may be provided in parallel with the vertical direction Z, and thus, may be inclined in the vertical direction Z by an angle "θ" of N degrees from the normal line direction ND.

For example, if the floor 110 has a curved shape having a curvature R of 3,800, the screw thread 131 may be inclined by an angle of about 6 degrees in the vertical direction Z from the normal line direction ND, and thus, may be vertically provided in an edge of the floor 110 having a curved shape. As another example, if the floor 110 has a curved shape having a curvature R of 1,900, the screw thread 131 may be inclined by an angle of about 12 degrees in the vertical direction Z from the normal line direction ND, and thus, may be vertically provided in the edge of the floor 110 having a curved shape. As a result, as the curvature R of the floor 110 is reduced, an angle of the screw thread 131 which is inclined in the vertical direction Z from the normal line direction ND may increase.

Each of the fastening parts 130 may further include a protrusion portion 133 which protrudes from the edge of the floor 110 and where the screw thread 131 is provided. Here, the screw thread 131 may be provided to pass through the protrusion portion 133 in the vertical direction Z.

The protrusion portion 133 may protrude from the edge of the floor 110 in a rear direction −Z opposite to a front direction +Z of the floor 110 to support the screw thread 131. Therefore, a forming space based on the protrusion portion 133 may be provided in the edge of the floor 110 and may be used as a space where elements for driving a display panel are disposed.

Each of the fastening parts 130 may further include a reinforcing part 135 which protrudes from the edge of the floor 110 to support the protrusion portion 133.

The reinforcing part 135 may protrude from the edge of the floor 110 in the rear direction −Z opposite to the front direction +Z of the floor 110 to support the protrusion portion 133. The reinforcing part 135 may reinforce strength of the supporting cover 100, thereby preventing the supporting cover 100 having a curved shape from being twisted or bent.

The protrusion portion 133 according to an embodiment may include one side portion 133*a* and another side portion 133*b* which are provided in the reinforcing part 135 with respect to a center of the screw thread 131.

The one side portion 133*a* may protrude from the reinforcing part 135 and may be spaced apart from the first side walls 120*a* and 120*b* adjacent to each other by a first distance D1. On the other hand, the other side portion 133*b* may protrude from the reinforcing part 135 and may be spaced apart from the first side walls 120*a* and 120*b* adjacent to each other by a second distance D2 which is longer than the first distance D1. Each of the one side portion 133*a* and the other side portion 133*b* of the protrusion portion 133 may protrude from the reinforcing part 135, thereby additionally reinforcing strength of the supporting cover 100 and supporting the screw thread 131.

Figure 6:
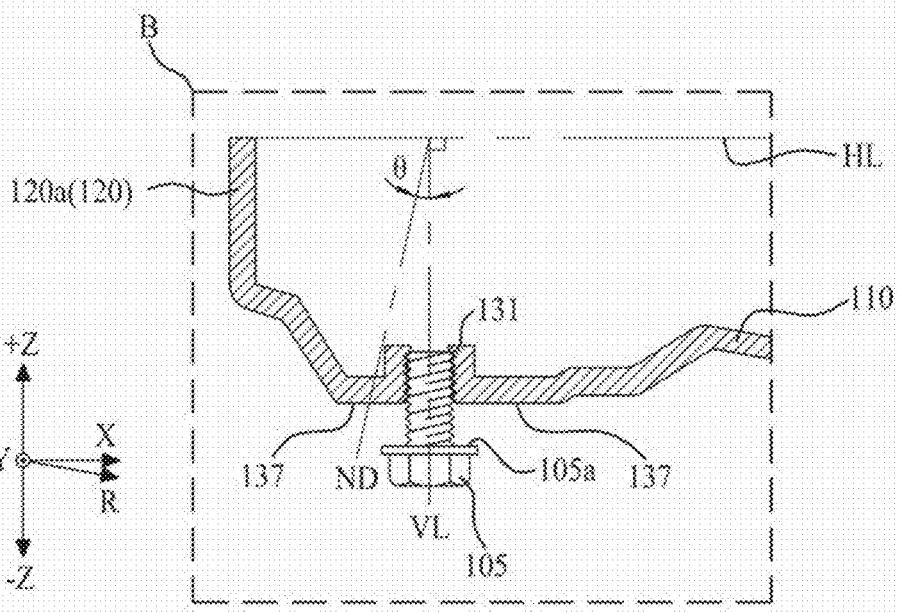
FIG. 6 is a diagram for describing a fastening direction of a screw fastened to a screw thread illustrated in FIG. 5.

Each of the fastening parts 130, as illustrated in FIGS. 5 and 6, may further include a supporting surface 137 facing a head 105*a* of the screw 105 fastened to the screw thread 131.

The supporting surface 137, a rear surface of the protrusion portion 133, may be provided in a planar shape parallel to the virtual horizontal line HL, and thus, may allow the screw 105 to be inclined in the vertical direction Z from the normal line direction ND with respect to the curved shape of the floor 110 or to be fastened to the screw thread 131 along the vertical direction Z. Therefore, the screw 105 may be fastened to each of the fastening parts 130 through a screw-through hole which is provided to overlap each of the fastening parts 130, thereby fixing the housing to the supporting surface 137 in a planar state.

Additionally, the supporting cover 100 for curved display according to the first embodiment of the present invention may further include a plurality of auxiliary reinforcing parts 140 and a plurality of auxiliary fastening parts 150.

Each of the plurality of auxiliary reinforcing parts 140 may protrude in a rear direction from a middle area of the floor 110 other than an area where the reinforcing part 140 provided along the edge of the floor 110 is provided, and may additionally reinforce strength of the supporting cover 100, thereby preventing the supporting cover 100 having a curved shape from being twisted or bent.

The plurality of auxiliary fastening parts 150 may be provided in each of the plurality of auxiliary reinforcing parts 140 and may be fastened to an auxiliary screw passing through the housing, thereby enabling the supporting cover 100 to more stably be supported by the housing. Each of the plurality of auxiliary fastening parts 150 may include an auxiliary screw thread which passes through an auxiliary protrusion portion, protruding from each of the plurality of auxiliary reinforcing parts 140, in the vertical direction Z. The plurality of auxiliary fastening parts 150 may be provided in the floor 110 which is relatively smaller in curvature than the fastening parts 130, and thus, a screw fastening defect does not occur when the auxiliary screw is fastened. However, in order to prevent an auxiliary screw fastening defect, each of the plurality of auxiliary fastening parts 150 may include an auxiliary screw thread which is inclined in the vertical direction Z from the normal line direction ND with respect to the curved shape of the floor 110.

In the supporting cover 100 for curved display according to the first embodiment of the present invention, the screw thread 131 of the fastening part 130 may be inclined in the vertical direction Z from the normal line direction ND with respect to the curved shape of the floor 110 or may be provided along the vertical direction Z vertical to the virtual horizontal line HL, thereby preventing a screw fastening defect from occurring in assembling the fastening parts 130 and the housing.

Figure 7:
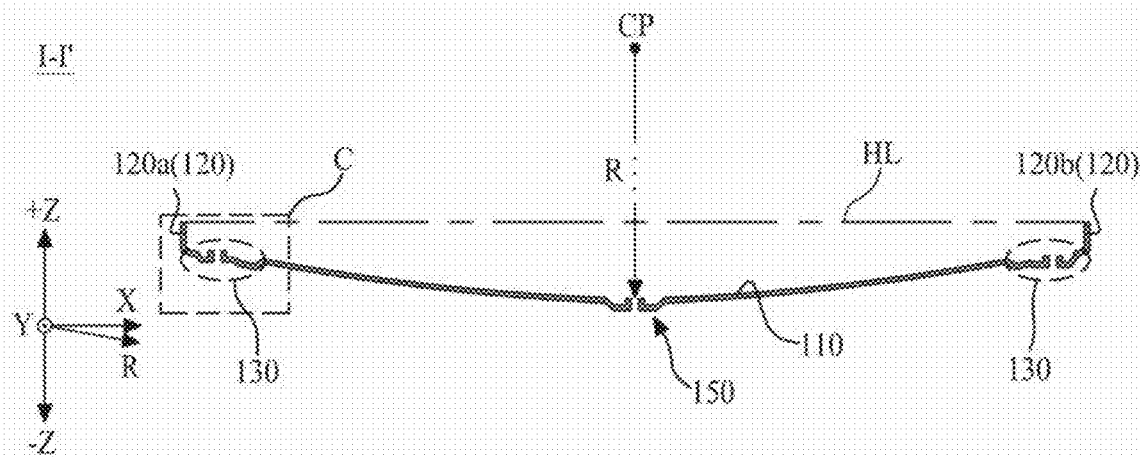
FIG. 7 is a cross-sectional view taken along line I-I' of FIG. 3 and is a diagram for describing a supporting cover for curved display according to a second embodiment of the present invention.
Figure 8:
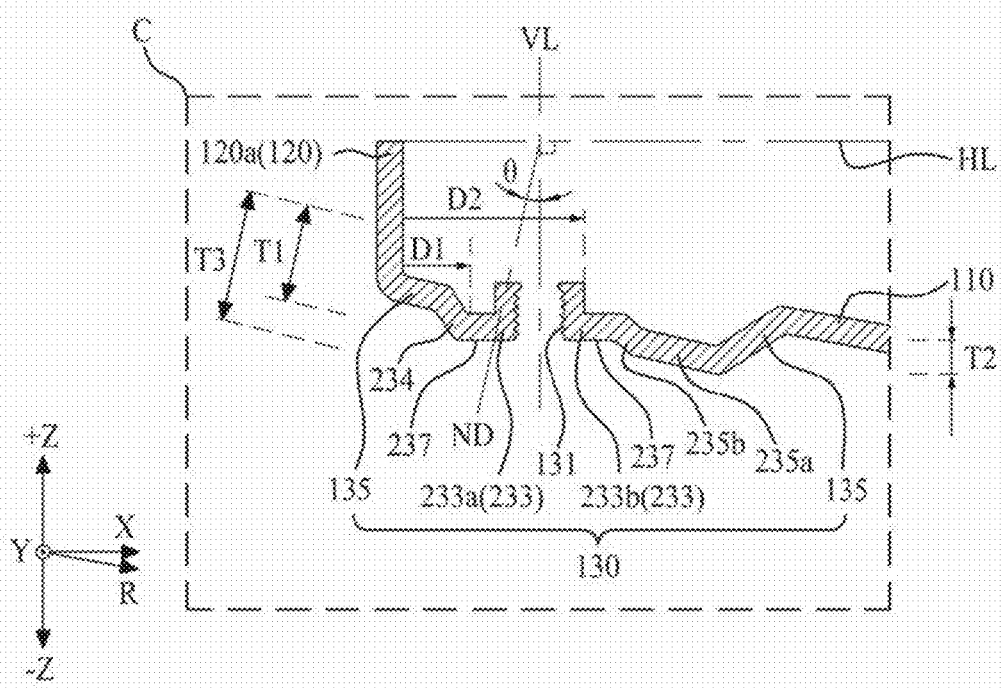
FIG. 8 is an enlarged view of a C portion illustrated in FIG. 7.
Figure 9:
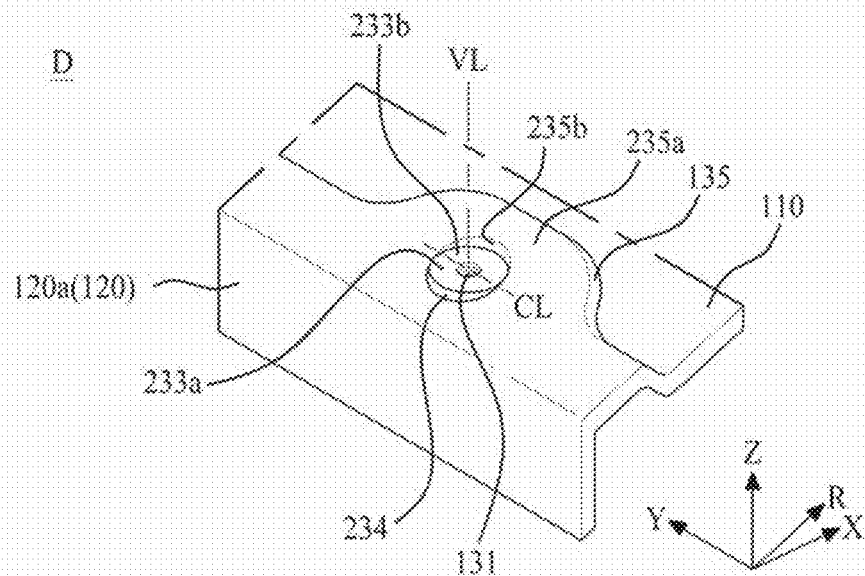
FIG. 9 is an enlarged view of a D portion illustrated in FIG. 3.

FIG. 7 is a cross-sectional view taken along line I-I' of FIG. 3 and is a diagram for describing a supporting cover 100 for curved display according to a second embodiment of the present invention. FIG. 8 is an enlarged view of a C portion illustrated in FIG. 7. FIG. 9 is an enlarged view of a D portion illustrated in FIG. 3. The drawings illustrate a modification of a structure of the protrusion portion in the supporting cover for curved display according to the first embodiment of the present invention. Therefore, in the following description, only a protrusion portion and elements relevant thereto may be described, and repetitive descriptions of the other elements are not repeated or may be brief.

Referring to FIGS. 7 and 8, in the supporting cover 100 for curved display according to the second embodiment of the present invention, a protrusion portion 233 may protrude in a rear direction −Z of the floor 110 from a reinforcing part 135 which is provided on the floor 110, and may support a screw thread 131. Here, the screw thread 131 may be provided to pass through the protrusion portion 233 in a vertical direction Z.

The protrusion portion 233 according to an embodiment may include one side portion 233a and another side portion 233b which are provided in the reinforcing part 135 with respect to a center of the screw thread 131.

The one side portion 233a may be one half portion of the protrusion portion 233 toward adjacent first side walls 120a and 120b from a center line CL of the screw thread 131. The one side portion 233a may protrude in the rear direction −Z of the floor 110 from the reinforcing part 135 and may be spaced apart from the adjacent first side walls 120a and 120b by a first distance D1. In this case, a first inclined surface 234 which protrudes at a first angle in the rear direction −Z of the floor 110 from the reinforcing part 135 may be provided between the one side portion 233a and the reinforcing part 135 which is coupled to the first side walls 120a and 120b. Accordingly, the one side portion 233a may be coupled to the first inclined surface 234 in parallel with a virtual horizontal line HL.

The other side portion 233b may be another half portion of the protrusion portion 233 toward a center of the floor 110 from the center line CL of the screw thread 131. The other side portion 233b may be spaced apart from the adjacent first side walls 120a and 120b by a second distance D2 longer than the first distance D1 and may be recessed in a front direction +Z of the floor 110 from the reinforcing part 135. In this case, a second inclined surface 235a which is recessed at a second angle in the front direction +Z of the floor 110 from the reinforcing part 135 and a third inclined surface 235b which is further recessed at a third angle in the front direction +Z of the floor 110 from the second inclined surface 235a may be provided between the other side portion 233b and the reinforcing part 135 which is coupled to the floor 110. Here, the second inclined surface 235a may have a curvature which is the same as that of the floor 110, or may be disposed on the same horizontal line as the first inclined surface 234. Accordingly, the other side portion 233b may be coupled to the third inclined surface 235b in parallel with the virtual horizontal line HL. Here, the third inclined surface 235b may be omitted.

Since the other side portion 233b is recessed in the front direction +Z of the floor 110 from the reinforcing part 135 by the second and third inclined surfaces 235a and 235b, the other side portion 233b may be parallel to the virtual horizontal line HL, and thus, a protrusion thickness T1 of the protrusion portion 233 protruding from the floor 110 may decrease by a recessed thickness T2 of the other side portion 233b. For example, if the other side portion 233b protrudes from the reinforcing part 135 in parallel with the virtual horizontal line HL without being recessed from the reinforcing part 135, the one side portion 233a may protrude higher than the other side portion 233b, and thus, a protrusion thickness T3 of the protrusion portion 233 protruding from the floor 110 may increase. Therefore, in the second embodiment of the present invention, the protrusion portion 233 may protrude from the reinforcing part 135 in parallel with the virtual horizontal line HL, but since the other side portion 233b is recessed from the reinforcing part 135 to have the same curvature as that of the floor 110, a protrusion height of the one side portion 233a of the protrusion portion 233 may decrease by the recessed thickness T2 of the other side portion 233b. Accordingly, according to the present embodiment, the thickness of the supporting cover 100 for curved display is slimmed or decreased.

Figure 10:
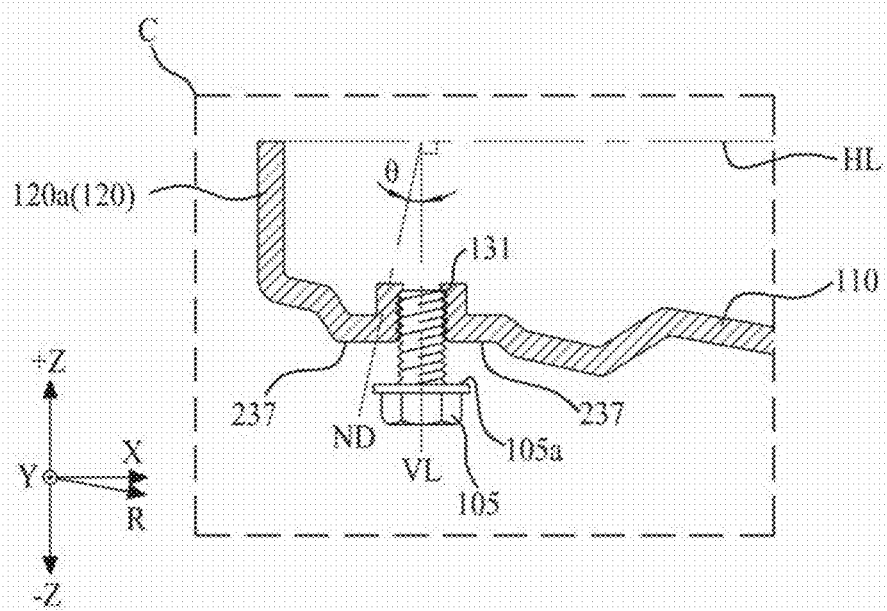
FIG. 10 is a diagram for describing a fastening direction of a screw fastened to a screw thread illustrated in FIG. 8.

In the supporting cover 100 for curved display according to the second embodiment of the present invention, as illustrated in FIGS. 8 and 10, a fastening part 130 may further include a supporting surface 237 facing a head 105a of a screw 105 fastened to the screw thread 131.

The supporting surface 237, a rear surface of the protrusion portion 233, may be provided in a planar shape parallel to the virtual horizontal line HL, and thus, may allow the screw 105 to be inclined in a vertical direction Z from a normal line direction ND with respect to a curved shape of the floor 110 or to be fastened to the screw thread 131 along the vertical direction Z. Therefore, the screw 105 may be fastened to the fastening part 130 through a screw-through hole which is provided to overlap the fastening part 130, thereby fixing the housing to the supporting surface 237 in a planar state.

The supporting cover 100 for curved display according to the second embodiment of the present invention provides the same effects as those of the supporting cover according to the first embodiment of the present invention. Also, according to the second embodiment of the present invention, the protrusion height of the protrusion portion 233 is reduced, and thus, the supporting cover 100 has a thin thickness.

Figure 11:
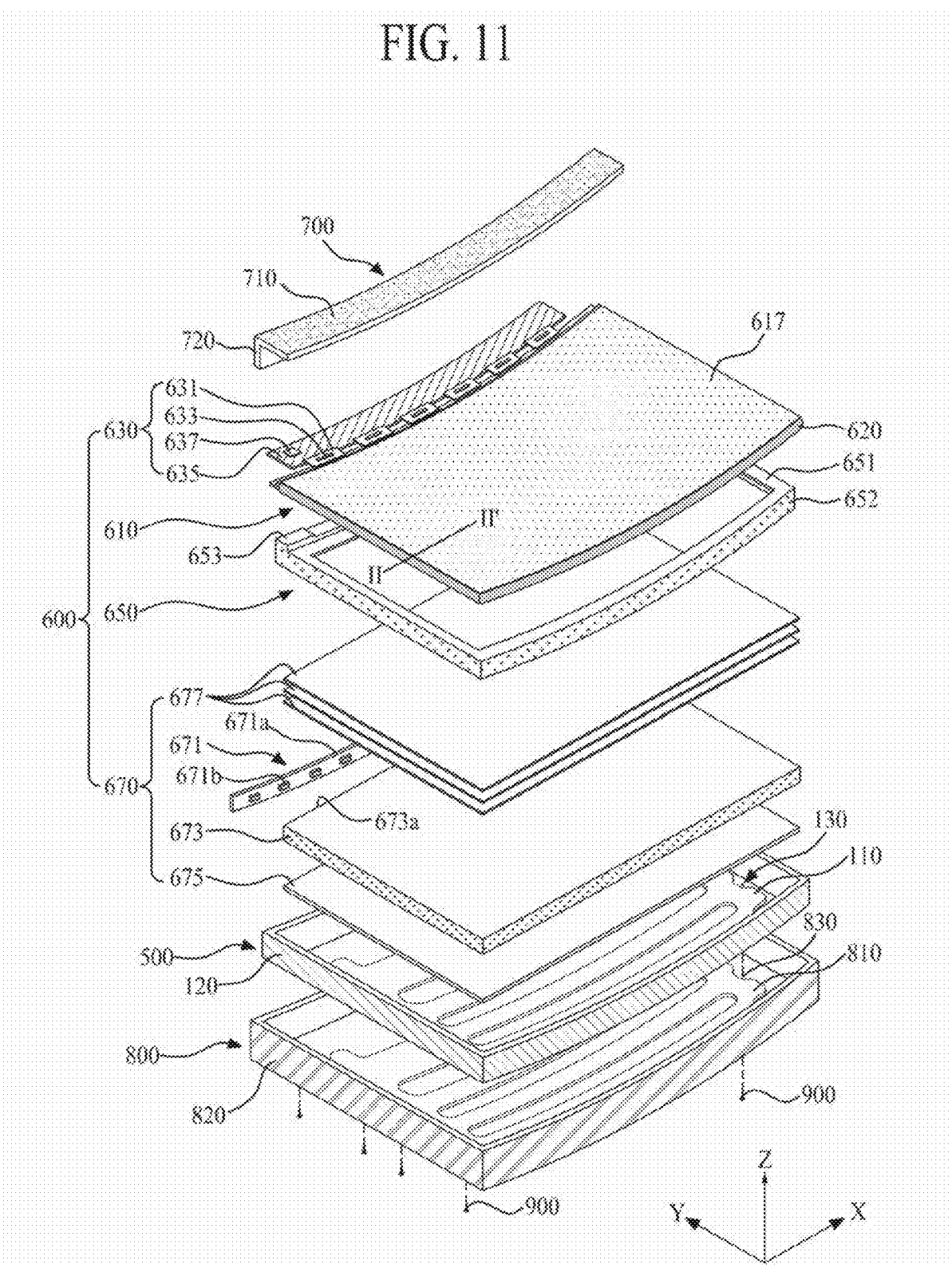
FIG. 11 is an exploded perspective view for describing a curved display device according to a first embodiment of the present invention.
Figure 12:
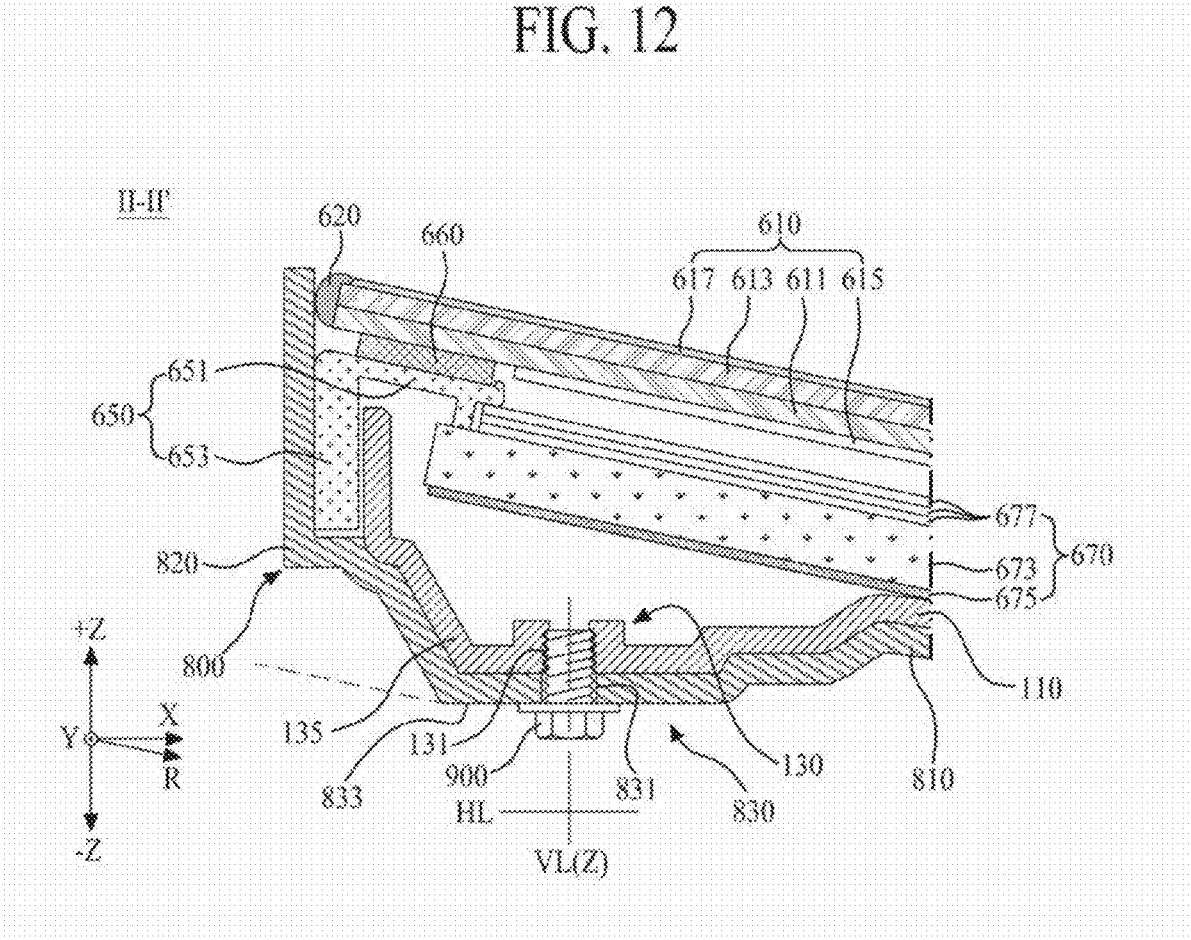
FIG. 12 is a cross-sectional view taken along line II-II' of FIG. 11.

FIG. 11 is an exploded perspective view for describing a curved display device according to a first embodiment of the present invention, and FIG. 12 is a cross-sectional view taken along line II-IP of FIG. 11. All the components of the curved display device according to all embodiments of the present invention are operatively coupled and configured.

Referring to FIGS. 11 and 12, the curved display device according to the first embodiment of the present invention may include a bottom cover 500, a display module 600, a curved portion cover 700, a housing 800, and a plurality of screws 900.

The bottom cover 500 may include a floor 110, a side wall part 120, and a plurality of fastening parts 130. The bottom cover 500 include the same elements as those of the supporting cover 100 for curved display according to the first embodiment of the present invention illustrated in FIGS. 3 to 6, and thus, its detailed description is not repeated or may be brief. Also, the bottom cover 500 may include an accommodating space which is defined in the floor 110 and the side wall part 120.

The display module 600 may be accommodated into the accommodating space of the bottom cover 500 to display an image. The display module 600 according to an embodiment may include a display panel 610, a panel driving circuit 630, a guide frame 650, a panel coupling member 660, and a backlight unit 670.

The display panel 610 may display an image by using light irradiated from the backlight unit 670 and may include a lower substrate 611 and an upper substrate 613 which are opposite-bonded to each other with a liquid crystal layer therebetween, a lower polarizing member 615, and an upper polarizing member 617.

The lower substrate 111 may be a thin film transistor (TFT) array substrate and may include a pixel array including a plurality of pixels which are respectively provided in a plurality of pixel areas defined by intersections of a plurality of gate lines and a plurality of data lines. Each of the plurality of pixels may include a TFT connected to a gate line and a data line, a pixel electrode connected to the TFT, and a common electrode which is provided adjacent to the pixel electrode and receives a common voltage.

A pad part connected to a plurality of signal lines may be provided at one edge of the lower substrate 611 and may be connected to the panel driving circuit 630. Also, a gate driving circuit for supplying a gate (or scan) signal to the gate lines may be provided in a lengthwise non-display area of the lower substrate 611. The gate driving circuit may be connected to the gate lines and may be provided in a process of manufacturing the TFT of each of the plurality of pixels.

The upper substrate 613 may include a pixel defining pattern, which defines an opening area overlapping each of the plurality of pixel areas provided on the lower substrate 611, and a color filter that is provided in the opening area. The upper substrate 613 may be opposite-bonded to the lower substrate 611 by a sealant with the liquid crystal layer therebetween.

The liquid crystal layer may be disposed between the lower substrate 611 and the upper substrate 613 and may include liquid crystal where an alignment direction of liquid crystal molecules are changed according to an electric field which is generated by a data voltage applied to the pixel electrode and the common voltage applied to the common electrode in each of the plurality of pixels.

The lower polarizing member 615 may be attached to a bottom of the lower substrate 611 and may polarize light incident from the backlight unit 670 with respect to a first polarizing axis to irradiate the polarized light onto the lower substrate 611.

The upper polarizing member 617 may be attached to a top of the upper substrate 613 to polarize light that passes through the upper substrate 613 and is transferred to the outside. The upper polarizing member 617 according to an embodiment may include a polarizing film that is attached to the top of the upper substrate 613 to polarize the light, which passes through the upper substrate 613 and is transferred to the outside, with respect to a second polarizing axis different from the first polarizing axis. The upper polarizing member 617 according to another embodiment may include the polarizing film and a retarder film that is attached to the top of the polarizing film to separate a three-dimensional (3D) image (i.e., a left-eye image and a right-eye image), displayed by the display panel 610, into images having different polarization states.

The display panel 610 may drive the liquid crystal layer with the electric field which is generated by the data voltage and the common voltage applied to each of the plurality of pixels, thereby displaying a color image according to light passing through the liquid crystal layer.

In addition, the display module 600 may further include a side sealing member 620.

The side sealing member 620 may be provided to cover three side surfaces of the display panel 610 except one edge of the display panel 610. For example, with respect to a vertically disposed display surface of the display panel 610, the side sealing member 620 may directly cover the three side surfaces of the display panel 610 including a left surface, a left upper corner part, an upper surface, a right upper corner part, and a right surface except a lower surface of the display panel 610 where the pad part is provided. The side sealing member 620 protects the side surfaces of the display panel 610 from an external impact and prevents light from being leaked through the side surfaces of the display panel 610.

The side sealing member 620 may be formed of a silicon-based or UV hardening-based sealant (or resin), but considering a process tack time, the side sealing member 620 may be formed of a UV hardening-based sealant. Also, the side sealing member 620 may be colored (for example, blue, red, bluish green, or black), but is not limited thereto. In order to prevent light from being leaked through the side surfaces, the side sealing member 620 may be formed of a colored resin or a light blocking resin.

The panel driving circuit 630 may be connected to the pad part provided on the lower substrate 611 to drive the pixels of the display panel 610, thereby displaying a color image in the display panel 610. The panel driving circuit 630 according to an embodiment may include a plurality of flexible circuit films 631 connected to the pad part of the display panel 610, a data driving integrated circuit (IC) 633 mounted on each of the plurality of flexible circuit films 631, a printed circuit board (PCB) 635 coupled to each of the plurality of flexible circuit films 631, and a timing controller 637 mounted on the PCB 635.

Each of the plurality of flexible circuit films 631 may be attached between the pad part of the lower substrate 611 and the PCB 635 by a film attaching process and may be formed of a tape carrier package (TCP) or chip on film (COF, chip on flexible board). Each of the plurality of flexible circuit films 631 may be bent along the lower surface of the display panel 610 and may be disposed on a rear surface of the bottom cover 500.

The data driving IC 633 may be mounted on each of the plurality of flexible circuit films 631 and may be connected to the pad part through the flexible circuit films 631. The data driving IC 633 may receive pixel data for each pixel and a data control signal which are supplied from the timing controller 637, convert the pixel data for each pixel into an analog data signal according to the data control signal, and supply the analog data signal to a corresponding data line.

The PCB 635 may be connected to the plurality of flexible circuit films 631. The PCB 635 may respectively supply signals, which are necessary for displaying an image on each pixel of the display panel 610, to the data driving IC 633 and a gate driving circuit. To this end, various signal lines, various power circuits, a memory, etc. may be mounted on the PCB 635.

The timing controller 637 may be mounted on the PCB 635. The timing controller 637 may align digital image data input from a driving system according to a pixel arrangement structure of the display panel 610 to generate pixel data for each pixel in response to a timing synchronization signal supplied from an external driving system and may supply the generated pixel data for each pixel to the data driving IC 633. Also, the timing controller 637 may generate a data control signal and a gate control signal based on the timing synchronization signal to control a driving timing of each of the data driving IC 633 and the gate driving circuit.

In addition, the timing controller 637 may control the backlight unit 670 by using an edge type local dimming technology to separately control a luminance of each of regions of the display panel 610.

The display panel 610 connected to the panel driving circuit 630 may have a portrait shape which is bent in a lengthwise direction Y and where a widthwise-direction (X) length is longer than a lengthwise-direction (Y) length or may have a landscape shape which is bent in the widthwise direction X and where the widthwise-direction (X) length is shorter than the lengthwise-direction (Y) length, with respect to the position of the viewer. In the following description, the floor 100 is assumed as being bent in the landscape shape.

The display panel 610 according to an embodiment may be concavely bent in a predetermined curved shape by being heated at a predetermined temperature, and then, may be previously manufactured to have a concavely curved shape through a panel bending process of maintaining a bending state for a predetermined time. Subsequently, the display panel 610 may be supported in a concavely curved shape by the guide frame 650.

According to another embodiment, the display panel 610 may be manufactured in a plate shape, and then, may be supported by the guide frame 650, thereby having a concavely curved shape.

The guide frame 650 according to an embodiment may have a tetragonal frame shape and may be supported by the bottom cover 500 to support the display panel 610 in a curved shape. In this case, one side portion of the guide frame 650 may support the curved portion cover 700 to surround one side surface of the display panel 610, and the other portions except the one side portion of the guide frame 650 may be disposed under the display panel 610. The guide frame 650 according to an embodiment may include a panel coupling part 651, a guide side wall 652, and a protrusion side wall 653.

The panel coupling part 651 may be provided in a tetragonal frame shape having a central opening and may be disposed under the display panel 610 to support a rear edge of the display panel 610. The panel coupling part 651 may be supported by the side wall part 120 of the bottom cover 500.

The guide side wall 652 may be provided at a rear edge of the panel coupling part 651 to have a certain height. The guide side wall 652 may be disposed under the display panel 610 to surround side surfaces of the bottom cover 500. The guide side wall 652 may be coupled to the side wall part 120 of the bottom cover 500 by a fastening member having a hook structure.

The protrusion side wall 653 may be provided to have a certain height at a top edge of the panel coupling part 651 overlapping one edge of the display panel 610. That is, the protrusion side wall 653 may be provided on one side of the panel coupling part 651 to surround a lower surface of the display panel 610 and support the curved portion cover 700. The plurality of flexible circuit films 631 may be bent toward a rear surface of the bottom cover 500 to surround a top and a side surface of the protrusion side wall 653.

The guide frame 650 according to an embodiment may have a curved shape corresponding to the concavely curved display panel 610. That is, the guide frame 650 according to an embodiment may include a curved surface having the landscape shape with respect to a position of a viewer.

The panel coupling member 660 may physically couple the rear edge of the display panel 610 to the guide frame 650. That is, a bottom of the panel coupling member 660 may be physically coupled to the panel coupling part 651 of the guide frame 650, and a top of the panel coupling member 660 may be physically coupled to the rear edge of the display panel 610. The panel coupling member 660 may attach the display panel 610 to the guide frame 650, thereby maintaining a curved shape of the concavely curved display panel 610 and preventing the display panel 610 from being detached from the guide frame 650 and falling. In this case, the panel coupling member 660 may be coupled to the lower substrate 611 of the display panel 610 in consideration of a coupling force and thicknesses of the guide frame 650 and the display panel 610, but is not limited thereto. For example, the panel coupling member 660 may be coupled to the lower polarizing member 615 of the display panel 610. For example, the panel coupling member 660 may be a double-sided tape, a heat-hardening adhesive, a photocurable adhesive, a foam tape, or the like, but may be a double-sided tape or a foam tape having a certain elastic force for absorbing an impact. Additionally, the panel coupling member 660 may include a hollow portion. In this case, the hollow portion may mitigate pressure applied to the display panel 610, and when the display panel 610 moves, the hollow portion prevents the panel coupling member 600 from being stripped from the display panel 610.

The panel coupling member 660 may be applied for enhancing an aesthetic appearance and reducing a bezel width and the number of elements of the curved display device by removing a top case, which covers a front edge of the display panel 610, from the curved display device. That is, since the display panel 610 is fixed to the guide frame 650 by the panel coupling member 660, a top case of the related art for preventing the display panel 610 supported by the guide frame 650 from falling may be removed. Therefore, the curved display device according to the present embodiment does not need a separate top case, and all surfaces other than one edge of the display panel 610 may have a flat shape and may be exposed to the outside, thereby enhancing an aesthetic appearance and reducing a bezel width and the number of elements of the curved display device. Also, since the top case of the related art is removed, a side surface of the display panel 610 is exposed to the outside, and for this reason, the display panel 610 can be damaged by an external impact, or light can be leaked through the side surface due to the total internal reflection of the display panel 610. On the other hand, in the curved display device according to the present embodiment, the side sealing member 620 provided on the side surface of the display panel 610 protects the side surface of the display panel 610 from an external impact and prevents light from being leaked through the side surface.

The backlight unit 670 may be accommodated into the accommodating space of the bottom cover 500 to irradiate light onto a bottom of the display panel 610. The backlight unit 67 according to an embodiment may include a light source 671, a light guide plate 673, a reflective sheet 675, and an optical sheet part 677.

The light source 671 may irradiate light onto a light incident part 673a which is provided on one side surface of the light guide plate 673. Here, the light incident part 673a may include one long side of the light guide plate 673 overlapping the one edge of the display panel 610, but is not limited thereto. In other embodiments, the light incident part may include both long sides or both short sides of the light guide plate 673.

In order to minimize bezel widths of an upper side and left and right sides, the light incident part 673a may be provided on one long side of the light guide plate 673 overlapping the one edge of the display panel 610.

According to another embodiment, in order for heat transferred to the light source 671 from being transferred to the panel driver 630, the light incident part 673a may be provided on the other long side of the light guide plate 673 overlapping an edge of the display panel 610 opposite to the one edge of the display panel 610.

The light source 671 according to an embodiment may include a plurality of light emitting diode (LED) packages 671b that are mounted on a light source PCB 671a to emit white light according to a light source driving signal supplied from a backlight driver.

The plurality of LED packages 671b may be mounted on the light source PCB 671a to face the light incident part 673a of the light guide plate 673 and may be arranged at predetermined intervals along a length direction X of the light source PCB 671a.

The light guide plate 673 may be disposed under the rear surface of the display panel 610 and may transfer the light, which is incident through the light incident part 673a from the plurality of LED packages 671b, toward the rear surface of the display panel 610. The light guide plate 673 according to an embodiment may be manufactured in a flat shape and may be accommodated into the bottom cover 500 to have a curved shape. That is, the flat-shaped light guide plate 673 may be concavely bent by a self-weight when the flat-shaped light guide plate 673 is accommodated into the bottom cover 500, and thus, the light guide plate 673 may have a curved shape corresponding to that of the display panel 610. According to another embodiment, the light guide plate 673 may be manufactured in a curved shape corresponding to that of the concavely curved display panel 610 and may be accommodated into the bottom cover 500.

The reflective sheet 675 may be disposed on a floor 110 of the bottom cover 500 to reflect the light, which is incident from the light guide plate 673, toward the light guide plate 673, thereby minimizing the loss of the light traveling to a rear surface of the light guide plate 673.

The optical sheet part 677 may be disposed on the light guide plate 673 to enhance the luminance characteristic of light output from the light guide plate 673. For example, the optical sheet 677 may include a diffusive sheet, a prism sheet, and a dual brightness enhancement film, but is not limited thereto. In other embodiments, the optical sheet 677 may be configured by a stacked combination of two or more sheets selected from among a diffusive sheet, a prism sheet, a dual brightness enhancement film, and a lenticular sheet.

The curved portion cover 700 may be manufactured to have a curved shape corresponding to the display panel 610 and may be coupled to one side portion of the guide frame 650 to cover the one edge of the display panel 610. The curved portion cover 700 may cover the pad part of the lower substrate 611 and the panel driving circuit 630 connected to the pad part by covering the one edge of the display panel 610. The curved portion cover 700 according to an embodiment may include a front cover part 710 and a side cover part 720.

The front cover part 710 may cover the pad part of the display panel 610 and may have a curved shape corresponding to a curved shape of the display panel 610. The front cover part 710 may have a length and a height (or a width) for covering the one edge of the display panel 610. The front cover part 710 may be disposed to be spaced apart from a front surface (for example, a front surface of an upper polarizing member) of the one edge of the display panel 610 by a certain distance and may cover the front surface of the one edge of the display panel 610.

The side cover part 720 may be bent from the front cover part 710 to surround one side surface of the guide frame 650 and one side surface of the display panel 610. The side cover part 720 may be detachably coupled to one side surface of the guide frame 650 by a fastening member such as a screw, a hook, and/or the like. For example, each of both edges (i.e., one edge and the other edge) of the side cover part 720 may be coupled to one side surface of the guide frame 650 by a screw. Also, a portion other than the both edges of the side cover part 720 may be coupled to one side surface of the guide frame 650 through a plurality of hooks which are arranged at certain intervals.

The housing 800 may accommodate the bottom cover 500 and may surround all side walls of the display module 600. The housing 800 according to an embodiment may be an outermost case which configures an external appearance of a side surface and a rear surface of the curved display device. According to another embodiment, the housing 800 may be a middle frame supporting the bottom cover 500, and in this case, the housing 800 may be accommodated into a separate rear cover that configures the external appearance of the side surface and the rear surface of the curved display device. The rear cover may accommodate a power supply, which supplies power to the panel driver 630, and the driving system that supplies the timing synchronization signal and digital image data to the panel driver 630.

The housing 800 according to an embodiment may include a housing plate 810, a housing side wall 820, and a cover coupling part 830.

The housing plate 810 may cover a rear surface of the bottom cover 500. Here, the housing plate 810 may have a curved shape having the same curvature as that of the floor 110 of the bottom cover 500.

The housing side wall 820 may be coupled to an edge end of the housing plate 810 to surround the side wall part 120 of the bottom cover 500. That is, one side wall of the housing side wall 820 may surround the side cover part 720 of the curved portion cover 700, and the other side walls of the housing side wall 820 may surround the other guide side walls of the guide frame 650, which are not surrounded by the curved portion cover 700, and the side sealing member 620 provided on the side surface of the display panel 610. Therefore, each of the side surfaces of the display panel 610 may be surrounded by the housing side wall 820, and a top of one edge of the display panel 610 may be covered by the curved portion cover 700, whereby a top other than the top of the one edge of the display panel 610 may be exposed to the outside without being covered by an instrument.

The cover coupling part 830 may protrude in a rear direction −Z of the housing 800 from an edge of the housing plate 810 overlapping the fastening part 130 of the bottom cover 500. Here, the cover coupling part 830 may protrude to have the same shape as that of the fastening part 130 of the bottom cover 500, thereby minimizing an increase in thickness of the curved display device. The cover coupling part 830 may include a screw-through hole 831 overlapping the screw thread 131 which is provided in the fastening part 130 of the bottom cover 500.

The housing 800 according to an embodiment may further include a supporting surface 833 provided in the cover coupling part 830.

The supporting surface 833, a rear surface of the cover coupling part 830, may be provided in a planar shape parallel to the virtual horizontal line HL. The supporting surface 833 may support a head of each of the screws 900, thereby allowing each of the screws 900 to be fastened to the screw thread 131 provided in the bottom cover 500 along the vertical direction Z vertical to the virtual horizontal line HL.

Each of the plurality of screws 900 may pass through the screw-through hole 831 provided in the housing 800, may be fastened to the screw thread 131 provided in the fastening part 130 of the bottom cover 500, and may be supported by the supporting surface 833, thereby fixing the bottom cover 500 to the housing 800. In this case, each of the plurality of screws 900 may be inclined in the vertical direction Z or toward a vertical line VL vertical to the virtual horizontal line HL from a normal line direction with respect to a curved surface of the floor 110 provided in the bottom cover 500, or may be fastened to the screw thread 131 along the vertical direction Z.

In the curved display device according to the first embodiment of the present invention, the screw thread 131 of each of the screws 900 may have a fastening structure based on the vertical direction Z, thereby preventing a screw fastening defect from occurring in assembling the bottom cover 500 and the housing 800.

Figure 13:
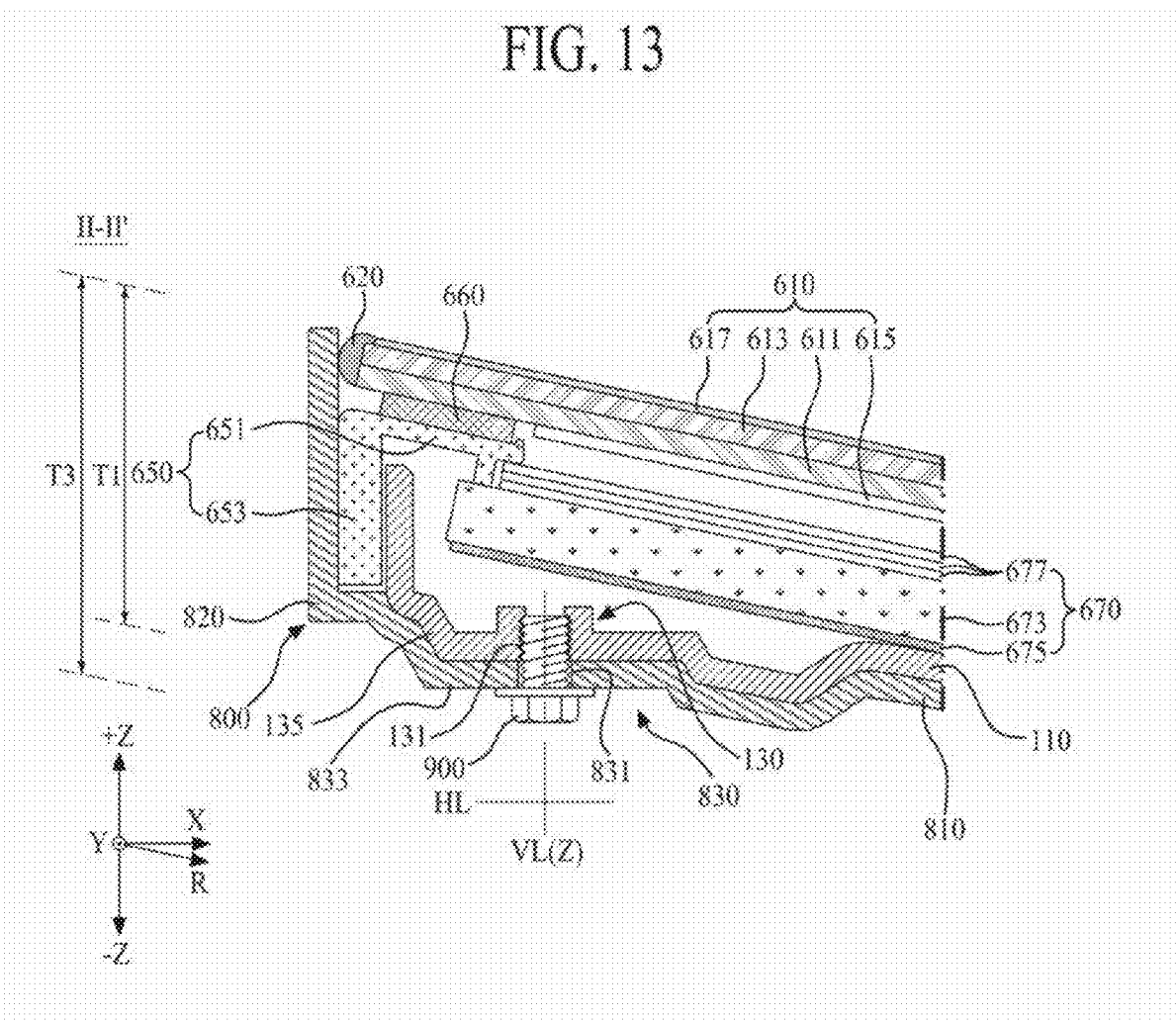
FIG. 13 is another cross-sectional view taken along line II-IP of FIG. 11 and is a diagram for describing a curved display device according to a second embodiment of the present invention.

FIG. 13 is another cross-sectional view taken along line II-II' of FIG. 11 and is a diagram for describing a curved display device according to a second embodiment of the present invention. The drawing illustrates a modification of a structure of each of the bottom cover and the housing in the curved display device according to the first embodiment of the present invention. Therefore, in the following description, only a bottom cover and a housing may be described, and repetitive descriptions of the other elements are not repeated or may be brief.

Referring to FIG. 13, in the curved display device according to the second embodiment of the present invention, a bottom cover 500 includes the same elements as those of the supporting cover 100 for curved display according to the second embodiment of the present invention illustrated in FIGS. 7 to 10, and thus, its detailed description is not repeated or may be brief.

A housing 800 may include a housing plate 810, a housing side wall 820, and a cover coupling part 830. Except that the cover coupling part 830 protrudes to have the same shape as that of the fastening part 130 of the bottom cover 500 and includes a screw-through hole 831 overlapping a screw thread 131 provided in a fastening part 130, the housing 800 is the same as (or similar to) the housing illustrated in FIG. 12, and thus, its detailed description is not repeated or may be brief.

The housing 800 may pass through the screw-through hole 831 provided in the housing 800 and may be fixed to the bottom cover 500 by each of a plurality of screws 900 fastened to the screw thread 131 provided in the fastening part 130 of the bottom cover 500.

The curved display device according to the second embodiment of the present invention have the same effects as those of the curved display device according to the first embodiment of the present invention. As described above, a protrusion height of a protrusion portion 233 provided in the bottom cover 500 may be reduced, and thus, the curved display device according to the second embodiment of the present invention may have a thickness T1 which is thinner than the thickness T3 of the curved display device according to the first embodiment of the present invention.

Figure 14:
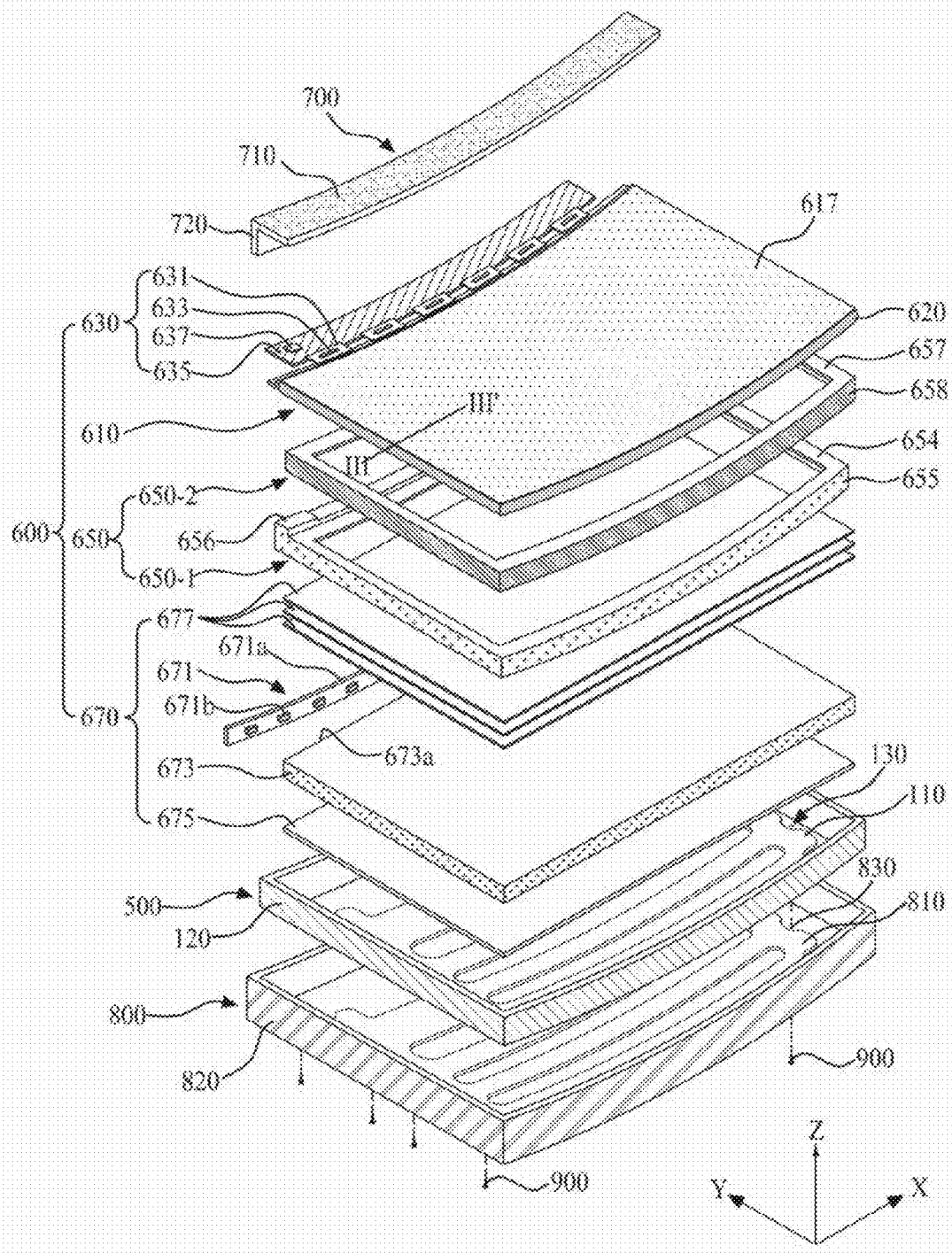
FIG. 14 is an exploded perspective view for describing a curved display device according to a third embodiment of the present invention.
Figure 15:
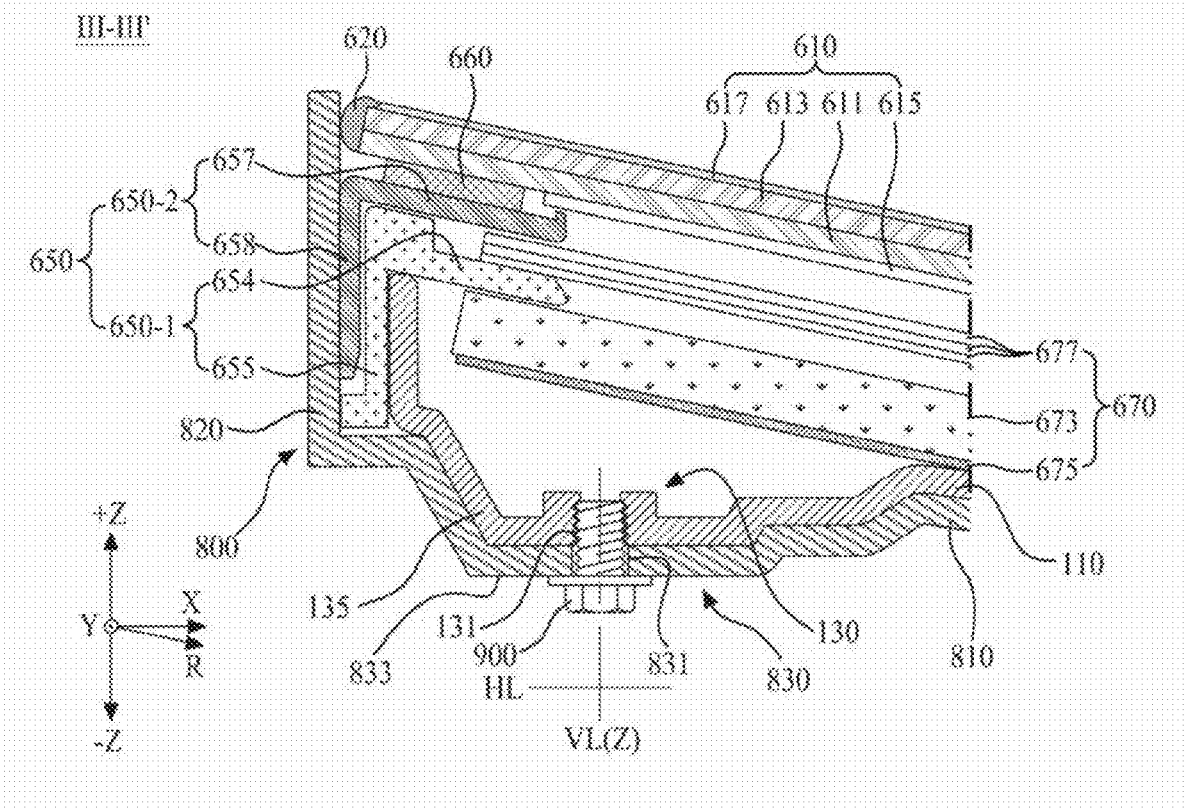
FIG. 15 is a cross-sectional view taken along line of FIG. 14.

FIG. 14 is an exploded perspective view for describing a curved display device according to a third embodiment of the present invention, and FIG. 15 is a cross-sectional view taken along line III-III' of FIG. 14. The drawings illustrate a modification of a structure of the guide frame in the curved display device according to the first embodiment of the present invention. Therefore, in the following description, only a guide frame and elements relevant thereto will be described, and repetitive descriptions of the other elements are not repeated or may be brief.

Referring to FIGS. 14 and 15, in the curved display device according to the third embodiment of the present invention, a guide frame 650 may have a tetragonal frame shape and may be supported by a bottom cover 500 to support a display panel 610.

According to another embodiment, the guide frame 650 may include a lower guide frame 650-1 and an upper guide frame 650-2.

The lower guide frame 650-1 may have a tetragonal frame shape and may be supported by the bottom cover 500 to support the upper guide frame 650-2. The lower guide frame 650-1 may have a curved shape corresponding to the display panel 610. The lower guide frame 650-1 according to an embodiment may include a frame supporting part 654, a lower guide side wall 655, and a protrusion side wall 656.

The frame supporting part 654 may be provided in a tetragonal frame shape having a central opening and may be disposed under the rear edge of the display panel 610 to support the upper guide frame 650-2 and an edge of the optical sheet part 677 of the backlight unit 670.

The lower guide side wall 655 may be provided in a rear edge of the frame supporting part 654 to have a certain height. The lower guide side wall 655 may provide an accommodating space, which is disposed under the frame supporting part 654, for the backlight unit 670 and may surround the side wall part 120 of the bottom cover 500. The lower guide side wall 655 may be coupled to the side wall part 120 of the bottom cover 500 by a first fastening member having a hook structure.

The protrusion side wall 656 may be provided to have a certain height in a top edge of the frame supporting part 654 overlapping the one edge of the display panel 610. That is, the protrusion side wall 656 may be provided on one side of the frame supporting part 654 to surround the lower surface of the display panel 610 and support the curved portion cover 700.

The upper guide frame 650-2 may have a planarly tetragonal frame shape and may be disposed on the lower guide frame 650-1 to support the display panel 610. The upper guide frame 650-2 may have a curved shape corresponding to the display panel 610. The upper guide frame 650-2 according to an embodiment may include a panel coupling part 657 and an upper guide side wall 658.

The panel coupling part 657 may be provided in a tetragonal frame shape having a central opening and may be disposed in the frame supporting part 654 of the lower guide frame 650-1 to support the rear edge of the display panel 610. In this case, the panel coupling part 657 may be physically coupled to the rear edge of the display panel 610 by the panel coupling member 660. In addition, the panel coupling part 657 may further include a guide groove for enabling the panel coupling member 660 to be easily disposed. The guide groove may be concavely provided to have a certain depth from a top of the panel coupling part 657, thereby guiding an arrangement position of the panel coupling member 660.

A plurality of the upper guide side walls 658 may be respectively provided to have a certain height in side edges other than one side edge of the panel coupling part 657 overlapping one side edge of the display panel 610. That is, the upper guide side walls 658 may be respectively provided to have a certain height in left, right, and upper edges of the panel coupling part 657 in parallel with the lower guide side wall 655 and thus may surround side walls other than one side wall of the lower guide side wall 655 of the lower guide frame 650-1. The upper guide side wall 658 may be coupled to the other side walls except one side wall in the lower guide side wall 655 by a second fastening member having a hook structure.

In the curved display device according to the third embodiment of the present invention, the guide frame 650 having a double structure including the upper guide frame 650-1 and the lower guide frame 650-2 may support the display panel 610, and thus, the display panel 610 is capable of moving in a horizontal direction and/or a vertical direction, thereby minimizing or preventing light leakage caused by the display panel 610 being pressed. Particularly, since light leakage caused by the display panel 610 being pressed occurs in an LCD device including a liquid crystal layer where liquid crystal molecules are driven by a lateral electric field instead of a vertical electric field, the guide frame 650 according to another embodiment may be applied for supporting a liquid crystal display panel based on an in-plane switching (IPS) mode.

The curved display device according to the third embodiment of the present invention provides the same effects as those of the curved display device according to the first embodiment of the present invention and minimizes or prevents the light leakage caused by the display panel 610 being pressed by using the double structure of guide frame 650.

Figure 16:
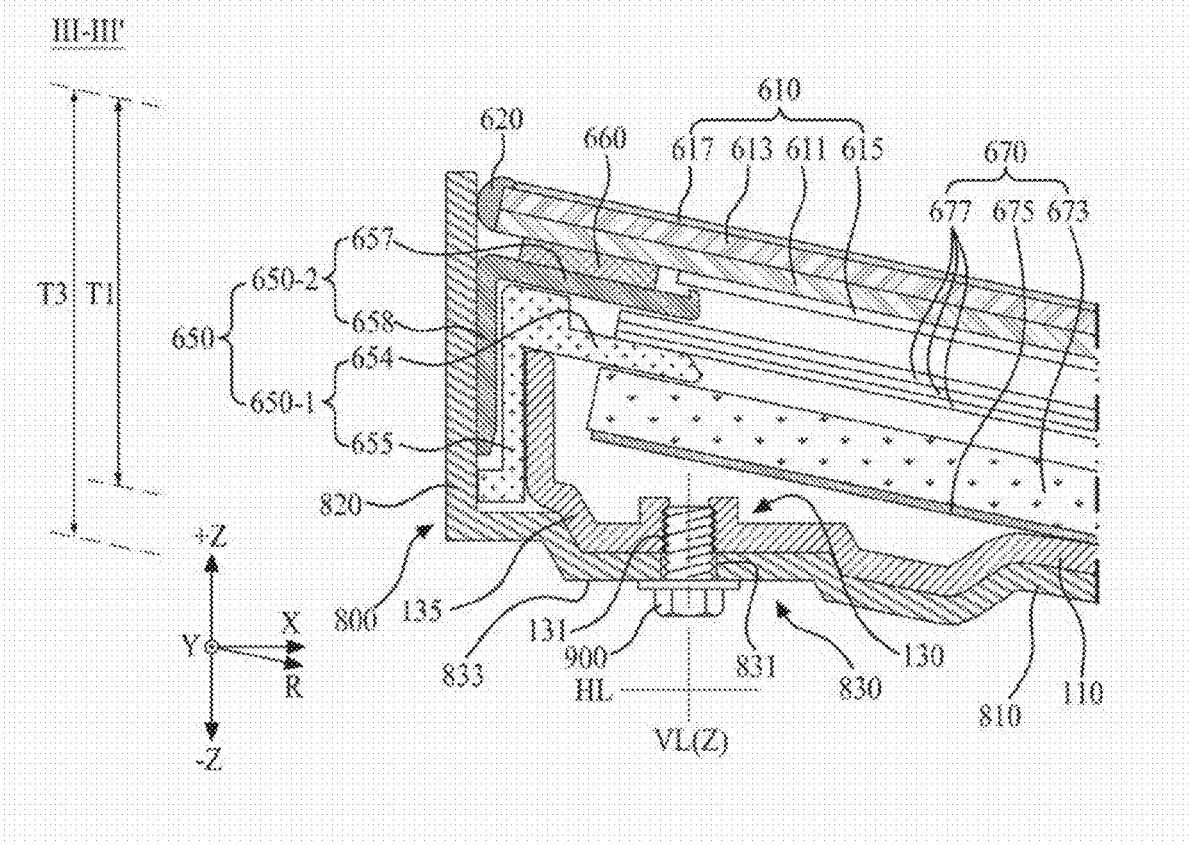
FIG. 16 is another cross-sectional view taken along line of FIG. 14 and is a diagram for describing a curved display device according to a fourth embodiment of the present invention.

FIG. 16 is another cross-sectional view taken along line III-III' of FIG. 14 and is a diagram for describing a curved display device according to a fourth embodiment of the present invention. The drawing illustrates a modification of a structure of each of the bottom cover and the housing in the curved display device according to the third embodiment of the present invention. Therefore, in the following description, only a bottom cover and a housing may be described, and repetitive descriptions of the other elements are not repeated or may be brief.

Referring to FIG. 16, in the curved display device according to the fourth embodiment of the present invention, a bottom cover 500 includes the same elements as those of the supporting cover 100 for curved display according to the second embodiment of the present invention illustrated in FIGS. 7 to 10, and thus, its detailed description is not repeated or may be brief.

A housing 800 may include a housing plate 810, a housing side wall 820, and a cover coupling part 830. Except that the cover coupling part 830 protrudes to have the same shape as that of the fastening part 130 of the bottom cover 500 and includes a screw-through hole 831 overlapping a screw thread 131 provided in a fastening part 130, the housing 800 is the same as (or similar to) the housing illustrated in FIG. 12, and thus, its detailed description is not repeated or may be brief.

The housing 800 may pass through the screw-through hole 831 provided in the housing 800 and may be fixed to the bottom cover 500 by each of a plurality of screws 900 fastened to the screw thread 131 provided in the fastening part 130 of the bottom cover 500.

The curved display device according to the fourth embodiment of the present invention have the same effects as those of the curved display device according to the third embodiment of the present invention. As described above, a protrusion height of a protrusion portion 233 provided in the bottom cover 500 may be reduced, and thus, the curved display device according to the fourth embodiment of the present invention may have a thickness T1 which is thinner than the thickness T3 of the curved display device according to the third embodiment of the present invention.

In the curved display device according to the above-described embodiments of the present invention, the display module 600 has been described above as including the backlight unit 670 and the display panel 610 including the liquid crystal layer, but is not limited thereto. In other embodiments, the display module 600 according to the embodiments of the present invention may be replaced by an organic light emitting display panel or a plasma display panel.

The curved display device according to the embodiments of the present invention may be applied to small and medium display devices, such as monitors for computers and/or the like, and large display devices having a large screen such as large-screen televisions and/or the like.

As described above, according to the embodiments of the present invention, the screw may be inclined in a vertical direction from a normal line direction with respect to the curved surface of the bottom cover or may be fastened to through the housing the screw thread which is provided in the protrusion portion of the bottom cover, thereby preventing a screw fastening defect from occurring in assembling the bottom cover and the housing.

Moreover, according to the embodiments of the present invention, since a protrusion height of the protrusion portion provided in the bottom cover is reduced, the curved display device has a thin thickness.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A supporting cover for a curved display, the supporting cover comprising:
   a floor having a curved shape;
   a side wall part including a plurality of side walls coupled to an edge end of the floor; and
   a fastening part including a screw thread provided in an edge of the floor,
   wherein an axis of the screw thread is inclined at an angle of N degrees from a normal line direction with respect to a curved surface of the floor, where N is a real number greater than zero,
   wherein the fastening part further comprises a reinforcing part protruding from the edge of the floor, and a protrusion portion including one side portion protruding from the reinforcing part and another side portion recessed from the reinforcing part,
   wherein the screw thread is provided in the protrusion portion in parallel with a vertical direction vertical to a virtual horizontal line which joins a pair of side walls facing each other,
   wherein the reinforcing part protrudes from the floor in the rear direction of the floor,
   wherein the one side portion of the protrusion portion protrudes from the reinforcing part in the rear direction of the floor, and
   wherein the another side portion of the protrusion portion is recessed from the reinforcing part in the front direction of the floor.

2. The supporting cover of claim 1,
   wherein the protrusion portion is provided in the reinforcing part.

3. The supporting cover of claim 1, wherein:
   the one side portion is spaced apart from the side wall part by a first distance, and
   the another side portion is spaced apart from the side wall part by a distance which is longer than the first distance.

4. The supporting cover of claim 3, wherein the fastening part further comprises:
a first inclined surface provided between the reinforcing part and the one side portion to cause the one side portion to protrude from the reinforcing part; and
a second inclined surface provided between the reinforcing part and the another side portion to cause the other side portion to be recessed from the reinforcing part.

5. The supporting cover of claim 4, wherein the second inclined surface has a curved shape having the same curvature as a curvature of the floor.

6. A curved display device comprising:
a bottom cover including the supporting cover for curved display as claimed in claim 1;
a display module accommodated into an accommodating space of the bottom cover;
a housing accommodating the bottom cover and surrounding each of side surfaces other than a front surface of the display module; and
a screw fastened to a screw thread of a fastening part, provided in the bottom cover, through the housing.

7. The curved display device of claim 6, wherein the housing comprises:
a housing plate covering a floor of the bottom cover;
a housing side wall surrounding a side wall part of the bottom cover; and
a cover coupling part protruding from an edge of the housing plate to overlap the fastening part of the bottom cover, and including a screw-through hole through which the screw passes.

8. The curved display device of claim 7, wherein the cover coupling part protrudes to have a same shape as a shape of the fastening part of the bottom cover.

9. The curved display device of claim 6, wherein the display module comprises:
a guide frame supported by a side wall part of the bottom cover; and
a display panel coupled to the guide frame.

10. The curved display device of claim 9, wherein the guide frame comprises:
a lower guide frame supported by the side wall part of the bottom cover; and
an upper guide frame supported by the lower guide frame and coupled to the display panel.

11. The curved display device of claim 10, wherein the upper guide frame is disposed under the display panel to support a rear edge of the display panel, and disposed on the lower guide frame.

12. The curved display device of claim 9, wherein the guide frame comprises:
a pane) coupling part disposed under the display panel to support a rear edge of the display panel; and
a guide side wall disposed under the display panel to surround side surfaces of the bottom cover.

13. The curved display device of claim 9, wherein the screw overlaps with the display panel.

14. The supporting cover of claim 6, wherein the fastening part further comprises:
a first inclined surface provided between the reinforcing part and the one side portion to cause the one side portion to protrude from the reinforcing part; and
a second inclined surface provided between the reinforcing part and the another side portion to cause the another side portion to be recessed from the reinforcing part, and
wherein the second inclined surface has the same curvature as a curvature of the floor.

15. A curved display device comprising:
a bottom cover;
a display module accommodated into an accommodating space of the bottom cover;
a housing accommodating the bottom cover and surrounding each of side surfaces other than a front surface of the display module; and
a screw fastened to a screw thread provided in the bottom cover through the housing,
wherein the bottom cover includes:
a floor having a curved shape;
a side wall part including a plurality of side walls coupled to an edge end of the floor; and
a fastening part including the screw thread provided in an edge of the floor,
wherein an axis of the screw thread is inclined at an angle of N degrees from a normal line direction with respect to a curved surface of the floor, where N is a real number greater than zero,
wherein the fastening part further comprises a protrusion portion protruding from the edge of the floor in a rear direction opposite to a front direction of the floor,
wherein the screw thread is provided in the protrusion portion in parallel with a vertical direction vertical to a virtual horizontal line which joins a pair of side walls facing each other,
wherein the display module comprises:
a guide frame supported by the side wall part of the bottom cover; and
a display panel coupled to the guide frame,
wherein the guide frame comprises:
a lower guide frame supported by the side wall part of the bottom cover; and
an upper guide frame supported by the lower guide frame and coupled to the display panel, and
wherein the upper guide frame is disposed under the display panel to support a rear edge of the display panel, and is disposed on the lower guide frame.

16. The curved display device of claim 15, wherein the housing comprises:
a housing plate covering a floor of the bottom cover;
a housing side wall surrounding a side wall part of the bottom cover; and
a cover coupling part protruding from an edge of the housing plate to overlap the fastening part of the bottom cover, and including a screw-through hole through which the screw passes.

17. The curved display device of claim 16, wherein the cover coupling part protrudes to have a same shape as a shape of the fastening part of the bottom cover.

18. The curved display device of claim 15, wherein the screw overlaps with the display panel.

* * * * *